(12) United States Patent
Martin et al.

(10) Patent No.: US 11,758,846 B2
(45) Date of Patent: Sep. 19, 2023

(54) HEADER CONTROL SYSTEM TO ADJUST A HEADER OF A HARVESTER BASED ON SENSOR INFORMATION

(71) Applicant: CNH Industrial America LLC, New Holland, PA (US)

(72) Inventors: Jethro Martin, Ephrata, PA (US); Cory Douglas Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 716 days.

(21) Appl. No.: 16/724,758

(22) Filed: Dec. 23, 2019

(65) Prior Publication Data

US 2021/0185880 A1    Jun. 24, 2021

(51) Int. Cl.
*A01D 41/14* (2006.01)
*A01D 34/28* (2006.01)
*A01D 34/24* (2006.01)

(52) U.S. Cl.
CPC ......... *A01D 41/141* (2013.01); *A01D 34/283* (2013.01); *A01D 41/145* (2013.01); *A01D 34/24* (2013.01)

(58) Field of Classification Search
CPC ..... A01D 34/24; A01D 41/145; A01D 41/141
See application file for complete search history.

(56) References Cited

U.S. PATENT DOCUMENTS 4,507,910 A    4/1985 Thornley et al.
7,805,921 B2   10/2010 Coers et al.
9,668,406 B2   6/2017 Dybro
10,188,039 B2  1/2019 Enge
10,318,138 B2  6/2019 Scholer et al.
2016/0106038 A1 4/2016 Boyd et al.
2018/0255706 A1* 9/2018 Smith ................. A01D 41/12
2019/0003495 A1 1/2019 Hunt et al.
2019/0003496 A1 1/2019 Hunt et al.
2019/0021226 A1 1/2019 Dima et al.
2019/0166762 A1 6/2019 Wu et al.
2019/0230857 A1* 8/2019 Thomson ............ A01D 41/141

(Continued)

FOREIGN PATENT DOCUMENTS

CN    103404298 A    11/2013
EP    3011824 A1    4/2016

(Continued)

OTHER PUBLICATIONS

International Search Report and Written Opinion for Application No. PCT/US2020/064244 dated Mar. 17, 2021 (13 pages).

*Primary Examiner* — Adam J Behrens
(74) *Attorney, Agent, or Firm* — Peter K. Zacharias (57) ABSTRACT

A control system for an agricultural system includes a first controller configured to receive sensor information from a plurality of sensors, in which the sensor information is indicative of a height of a header of the agricultural system, and the first controller is configured to convert the sensor information into position data. The control system further includes a second controller communicatively coupled to the first controller, in which the second controller is configured to receive the position data from the first controller, and the second controller is configured to determine a target position of the header based on the position data.

16 Claims, 5 Drawing Sheets

(56) References Cited

U.S. PATENT DOCUMENTS

2019/0307070 A1* 10/2019 Dima .................... A01D 57/04
2020/0053961 A1* 2/2020 Dix ..................... A01D 45/021
2021/0185918 A1 6/2021 Hunt et al.

FOREIGN PATENT DOCUMENTS

| EP | 3087819 | A2 | 11/2016 |
| EP | 3300580 | A1 | 4/2018 |
| EP | 3420797 | A1 | 1/2019 |
| EP | 3420798 | A1 | 1/2019 |
| EP | 3494771 | A1 | 6/2019 |
| EP | 3552474 | A1 | 10/2019 |
| WO | 2014023632 | A1 | 2/2014 |
| WO | 2014093814 | A1 | 6/2014 |
| WO | 2019140512 | A1 | 7/2019 |

* cited by examiner

HEADER CONTROL SYSTEM TO ADJUST A HEADER OF A HARVESTER BASED ON SENSOR INFORMATION

BACKGROUND

The disclosure relates generally to control of a harvester header.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A harvester may be used to harvest crops, such as barley, beans, beets, carrots, corn, cotton, flax, oats, potatoes, rye, soybeans, wheat, or other plant crops. During operation of the harvester, the harvesting process may begin by removing a portion of a plant from a field using a header of the harvester. The header may cut the plant and transport the cut crops to a processing system of the harvester. Certain headers include a cutter bar assembly configured to cut a portion of each crop (e.g., a stalk), thereby separating the cut crop from the soil. The cutter bar assembly may extend along a substantial portion of the width of the header at a forward end of the header. The header may also include one or more belts positioned behind the cutter bar assembly relative to the direction of travel of the harvester. The belt(s) are configured to transport the cut crops to an inlet of the processing system.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, a control system for an agricultural system includes a first controller configured to receive sensor information from a plurality of sensors, in which the sensor information is indicative of a height of a header of the agricultural system, and the first controller is configured to convert the sensor information into position data. The control system further includes a second controller communicatively coupled to the first controller, in which the second controller is configured to receive the position data from the first controller, and the second controller is configured to determine a target position of the header based on the position data.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The process of farming typically begins with planting seeds within a field. Over time, the seeds grow and eventually become harvestable crops. Typically, only a portion of each crop is commercially valuable, so each crop is harvested to separate the usable material from the remainder of the crop. For example, a harvester may cut agricultural crops within a field via a header. The header may also gather the cut agricultural crops into a processing system of the harvester for further processing. The processing system may include a threshing machine configured to thresh the agricultural crops, thereby separating the crops into certain desired agricultural materials, such as grain, and material other than grain (MOG). The desired agricultural materials may be sifted and then accumulated into a tank. When the tank fills to capacity, the materials may be collected from the tank. The MOG may then be discarded from the harvester (e.g., via a spreader).

The header may cut crops from the field that are encompassed within a length of the header. The header may include a cutter bar assembly that extends along at least a portion of the length of the header, and the cutter bar assembly may use blades to cut the crops. The cut crops may fall onto the header, and the cut crops may be gathered together, such as via conveyors that run across the header. The gathered agricultural crops may then be transported into the processing system of the harvester.

Certain harvesters may be configured to use a first header (e.g., first type of header; rigid header) having a rigid frame. For example, a harvester may include a first controller (e.g., harvester controller) that is configured to receive sensor information from a first set of sensors on the first header and to control a position of the first header relative to a chassis of the harvester (e.g., to adjust an overall height of the first header relative to the field) based on the sensor information from the first set of sensors. In some situations, it may be desirable to utilize a second header (e.g., second type of header; segmented header) instead of the first header. The second header may have a segmented frame that may more closely follow contours of the field. However, without the disclosed embodiments, the harvester may not be capable of use with the second header at least in part because the first controller may not be configured to receive sensor information from a second set of sensors on the second header and/or to control a position of the second header relative to the chassis of the harvester based on the sensor information from the second set of sensors.

Accordingly, the disclosed embodiments relate generally to systems and methods that enable a plurality of different embodiments of headers (e.g., the first header having a rigid frame and the second header having the segmented frame) to be employed by the harvester. For example, the disclosed embodiments generally include a control system and related methods that convert the sensor information received from the second set of sensors of the second header into position data that may be processed by the first controller and used by the first controller to control the position of the second header relative to the chassis of the harvester. Thus, the disclosed embodiments may enable use of various different headers with the harvester without modifications to the harvester and/or to the first controller. As such, the control system may reduce a complexity of manufacturing the harvester and/or enable the second header to be retrofitted onto the harvester (e.g., having the first controller that is not configured to receive the sensor information from second set of sensors on the second header and/or to control the position of the second header relative to the chassis of the harvester based on the sensor information from the second set of sensors).

More particularly and as discussed in more detail below, the control system may include the first controller configured to adjust the position of the first header relative to the chassis based on the sensor information received from the first set of sensors. Additionally, the control system may include a second controller (e.g., header controller) of the second header. The second controller may be configured to control respective positions of various sections (e.g., segments) of the second header relative to one another based on the sensor information received from the second set of sensors. In some embodiments, the second controller may also be communicatively coupled to the first controller and may process the sensor information received by the second set of sensors into data that enables the first controller to control the position (e.g., height) of the second header.

In this way, the harvester may employ either the first header or the second header. Furthermore, the second header may be installed without having to modify or replace the first controller. As an example, for existing harvesters that may already use the first controller, the second header and the second controller may be installed without having to modify the first controller to enable the first controller to adjust the height of the second header. Although this disclosure primarily discusses the use of two different header embodiments, there may be other header embodiments that may be used by the harvester to cut crops, and the harvester may use the first controller to adjust the height of the additional header embodiments.

Figure 1:
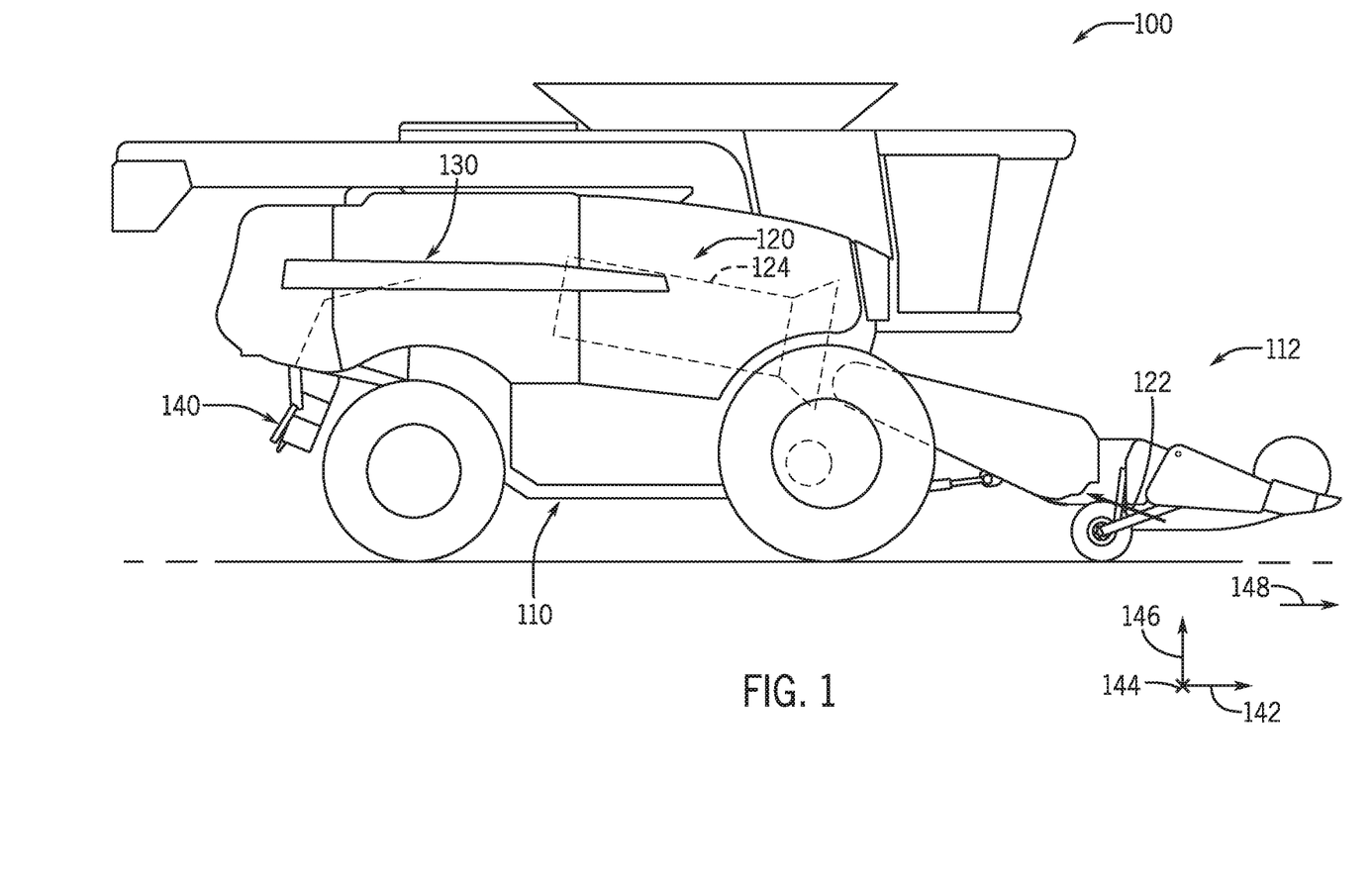
FIG. 1 is a side view of an embodiment of a harvester having a header, in accordance with an aspect of the present disclosure.

Turning now to the drawings, FIG. 1 is a side view of a harvester 100. The harvester 100 includes a chassis 110 that supports harvesting apparatus to facilitate harvesting crops. As described in greater detail below, the harvester 100 also includes a header 112 (e.g., small grain header) that cuts crops and directs the cut crops in a direction 122 toward an inlet of a crop processing system 120 of the harvester 100 for further processing of the cut crops. The crop processing system 120 receives the cut crops from the header 112. As an example, the crop processing system 120 includes a thresher 124 that conveys a flow of crops through the crop processing system 120. In some embodiments, the thresher 124 includes a cylindrical threshing rotor that transports the crops in a helical flow path. In addition to transporting the crops, the thresher 124 may also separate certain desired crop material (e.g., grain) from residue (e.g., MOG), such as husk and pods, and direct the residue into a cleaning system located beneath the thresher 124. The residue may be transported to a crop residue handling system 130, which may hold the crop residue for further processing and/or expels the crop residue from the harvester 100 via a crop residue spreading system 140 positioned at the aft end of the harvester 100. To facilitate discussion, the harvester 100 and/or its components may be described with reference to a lateral axis or direction 142, a longitudinal axis or direction 144, and a vertical axis or direction 146. The harvester 100 and/or its components may also be described with reference to a direction of travel 148 (e.g., along the lateral axis 142).

Figure 2:
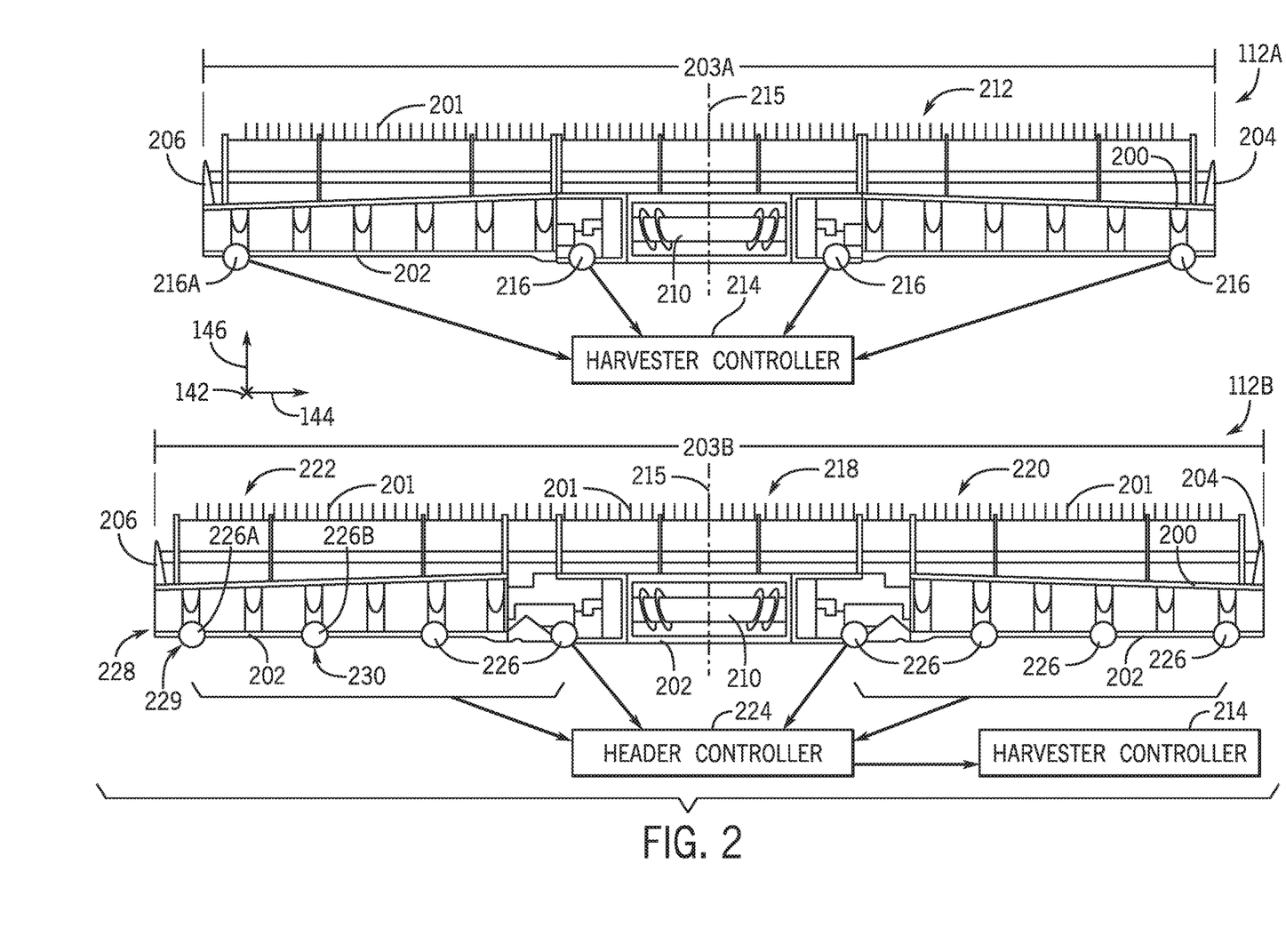
FIG. 2 is a rear view of various embodiments of headers that may be employed by the harvester of FIG. 1, in accordance with an aspect of the present disclosure.

FIG. 2 is a rear view of various embodiments of headers 112 that may be used by the harvester 100 of FIG. 1. Each header 112 includes a frame 200 that may be removably coupled to the harvester. Each header 112 also includes a reel 201 and a cutter bar assembly 202 that extends across a length 203 (e.g., along the longitudinal axis 144) of the frame 200 between side portions 204, 206 of the frame 200. When the harvester 100 is in operation, the reel 201 may engage the crops to prepare the crops to be cut by the cutter bar assembly 202, and blades of the cutter bar assembly 202 may engage and cut the crops. The portions of the crops that are cut are transported to the crop processing system via an inlet 210 of the header 112. For example, in some embodiments, each header 112 may have a conveyor and/or a reel configured to direct the cut crops toward the inlet 210 to be delivered to the crop processing system.

The harvester may be configured to employ a first header 112A (e.g., a rigid header), which may not be flexible across its length 203A. That is, the first header 112A may not include sections along the length 203A that are adjustable relative to one another. For instance, the first header 112A may include a single header segment 212 extending along the length 203A of the first header 112A. In some embodiments, the first header 112A may be communicatively coupled to a harvester controller 214, which may be configured to control a position of the first header 112A relative to a chassis of the harvester. The first header 112A may also be configured to tilt or rotate the first header 112A about an axis 215 extending through a center of the first header 112A perpendicularly with respect to the first length 203A. For instance, the harvester controller 214 may rotate the first header 112A such that the side portion 204 is not aligned or level with the side portion 206. The first header 112A may remain substantially straight along the first length 203A during operation of the harvester. In certain implementations, the harvester controller 214 may be configured to adjust the first header 112A based on information received from a first set of sensors 216. The first set of sensors 216 may generally monitor an operating parameter indicative of a distance (e.g., height) between the first header 112A and the field. The harvester controller 214 may be configured to raise, lower, and/or tilt the first header 112A relative to the field based on the readings made by the first set of sensors 216, such as to adjust the first header 112A toward a target position. In the illustrated embodiment, the first set of sensors 216 includes four sensors configured to output information to the harvester controller 214, but it should be noted that the first set of sensors may include any suitable number of sensors (e.g., one, two, three, five, six or more) configured to output information to the harvester controller in additional or alternative embodiments.

The harvester may further be configured to employ a second header 112B (e.g., a segmented header), which may be flexible across its length 203B. In other words, various sections of the second header 112B along the length 203B may be adjustable relative to one another, such as movable relative to the vertical axis 146 (e.g., to raise and/or lower relative to one another). Thus, the shape of the second header 112B may be adjustable so as to conform to a contour or profile of the field, thereby enabling the second header 112B to cut crops more effectively (e.g., cut a greater amount of the crops). The second header 112B includes a center segment 218, a first header segment 220, and a second header segment 222 in the illustrated embodiment, but the second header may include any number of header segments (e.g., two, four, five, six or more) in alternative embodiments. The respective heights of the center segment 218, the first header segment 220, and the second header segment 222 may be adjustable (e.g., rotatable) relative to one another. For instance, the first header segment 220 and the second header segment 222 may each be pivotally coupled to opposite ends of the center segment 218, and a position of the first header segment 220 relative to the center segment 218 may be independent of a position of the second header segment 222 relative to the center segment 218. That is, a position of the first header segment 220 may move (e.g., pivot) about the center segment 218 independently of movement of the second header segment 222. In the illustrated embodiment, the segments 218, 220, 222 each include a respective reel 201 and cutter bar assembly 202, but in additional or alternative embodiments, the segments may each share the same reel and cutter bar assembly that may each be flexible to accommodate movement of the segments relative to one another. In any case, adjustment of the segments 218, 220, 222 relative to one another may enable the cutter bar assembly or assemblies 202 to cut the crops more desirably.

The second header 112B may be communicatively coupled to the harvester controller 214 and a header controller 224. In an example, the harvester controller 214 may be supported on the harvester and the header controller 224 may be supported on the second header 112B. In some embodiments, the harvester controller 214 may be configured to adjust the second header 112B relative to the chassis, and the header controller 224 may be configured to move the first header segment 220 and/or the second header segment 222 relative to one another and the center segment 218. The header controller 224 may be communicatively coupled to a second set of sensors 226 and may be configured to move the first header segment 220 and/or the second header segment 222 relative to the center segment 218 based on readings made by the second set of sensors 226.

Using the header controller 224 may facilitate use of the second header 112B with the harvester. For instance, the same embodiment of the harvester controller 214 may be used regardless of the embodiment of the header 112 installed onto the harvester. By way of example, an existing harvester may currently use the first header 112A and the harvester controller 214. However, it may be desirable to replace the first header 112A with the second header 112B so as to increase effectiveness of the harvester to cut crops in the field. The second header 112B, along with the header controller 224, may retrofit onto the existing harvester without having to replace, dispose, or otherwise modify the harvester controller 214. In other words, the first header 112A may be removed from the harvester and the second header 112B may be installed onto the harvester without modifying the harvester controller 214. Similarly, the second header 112B may be removed from the harvester and the first header 112A may be installed onto the harvester without modifying the harvester controller 214. As a result, a complexity or difficulty of changing the header 112 of the harvester is reduced.

However, in certain embodiments, the second set of sensors 226 may not output the same set of sensor information as that output by the first set of sensors 216. Additionally, the harvester controller 214 may not be configured to receive the sensor information output by the second set of sensors 226. For this reason, to enable the second header 112B to be moved relative to the chassis, the header controller 224 may also be communicatively coupled with the harvester controller 214 and may convert sensor information received from the second set of sensors 226 into data that is readable by the harvester controller 214.

In some embodiments, the second set of sensors 226 may include a different number of sensors than that of the first set of sensors 216. In the illustrated embodiment, the header controller 224 is configured to operate based on readings from eight of the second set of sensors 226, and the harvester controller is configured to operate based on readings from four of the first set of sensors 216. As such, the header controller 224 may convert (e.g., interpolate) the sensor information received from the number of sensors in the second set of sensors 226 into data reflective of sensor information received from the number of sensors in the first set of sensors 216. By way of example, a first sensor 226A of the second set of sensors 226 may detect a first value indicative of a height (e.g., relative to a field) of a first header section 229 (e.g., of the second header segment 222), and a second sensor 226B, which is adjacent to the first sensor 226A, may detect a second value indicative of a height (e.g., relative to the field) of a second header section 230 adjacent to the first header section 229. The header controller 224 may convert (e.g., determine a mathematical mean of, take a maximum or minimum of) the first value and the second value into a third value, which may represent a value that is readable by the harvester controller 214 and/or causes the harvester controller 214 to adjust the second header 112B in an appropriate manner. For instance, the third value may represent (e.g., mimic, simulate) a reading detected by a third sensor 216A of the first set of sensors 216. The header controller 224 may convert readings made by a remainder of the second set of sensors 226 into values representing readings made by the first set of sensors 216 to enable the harvester controller 214 to control the second header 112B accordingly.

Additionally or alternatively, the second set of sensors may output a different type of information than that output by the first set of sensors. In certain embodiments, at least one of the first or second set of sensors may be contact (e.g., flex or pressure) sensors. The contact sensors (e.g., ground contact sensors) may extend from the header to contact the field during operation of the harvester, and each contact sensor may monitor a respective force exerted by the field onto the contact sensor. The exerted force may be indicative of the height of the corresponding section of the header relative to the field. For example, reducing the height of the header relative to the field may increase the force detected by the contact sensor, and increasing the height of the header relative to the field may reduce the force detected by the contact sensor. Additionally or alternatively, a movement of the contact sensors may be used to determine the height of the header relative to the field. For instance, the force exerted by the field onto the contact sensors may cause the contact sensors to flex or move, and the flexing or movement of the contact sensors may be indicative of the height of the header relative to the field. The contact sensors (e.g., flex sensors) may additionally or alternatively be positioned on the frame and/or the cutting assembly. Such embodiments of the contact sensor may monitor an amount of bending of the header (e.g., caused by a force exerted onto the cutter bar to bend the header by the field), and the detected bending may also be indicative of the height of the header relative to the field. In additional or alternative embodiments, at least one of the first or second set of sensors may be non-contact proximity sensors, such as infrared sensors, light detecting and ranging (LIDAR) sensors, optical sensors, hall effect sensors, and the like, configured to determine a distance between the header and the field without contacting the field. In any case, the first and second set of sensors may include the same or different types of sensor. As an example, the harvester controller may be configured to receive sensor information from only a particular type of proximity sensor, but the second set of sensors may include both proximity sensors and contact sensors. For this reason, the header controller may convert sensor information received from the second set of sensors into data representative of sensor information received from only the particular type of proximity sensor that the header controller is configured to receive and process.

Figure 3:
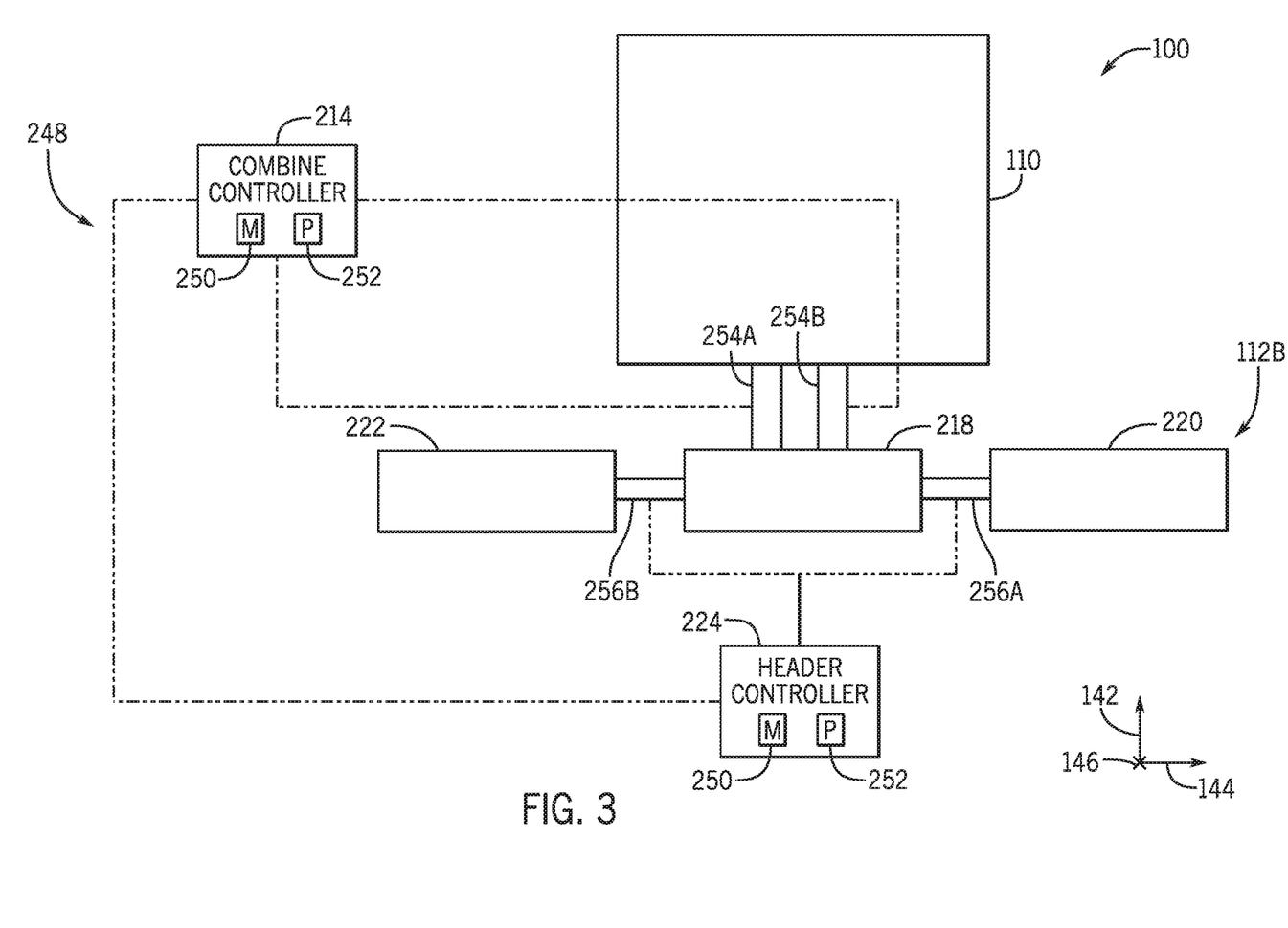
FIG. 3 is a schematic diagram of an embodiment of a harvester using one of the headers of FIG. 2, in accordance with an aspect of the present disclosure.

FIG. 3 is a schematic of an embodiment of the harvester 100 using the second header 112B of FIG. 2. The harvester 100 has a control system 248 that includes the harvester controller 214 and the header controller 224. Each of the harvester controller 214 and the header controller 224 may include a memory device 250 and a processor 252, such as a microprocessor. The harvester controller 214 and the header controller 224 may each also include one or more storage devices and/or other suitable components. Each processor 252 may be used to execute software, such as software for controlling the harvester 100 and/or the header 112B attached to the harvester 100. Moreover, each processor 252 may include multiple microprocessors, one or more "general-purpose" microprocessors, one or more special-purpose microprocessors, and/or one or more application specific integrated circuits (ASICS), or some combination thereof. For example, each processor 252 may include one or more reduced instruction set (RISC) or complex instruction set (CISC) processors. The memory device 250 may include a volatile memory, such as random access memory (RAM), and/or a nonvolatile memory, such as read-only memory (ROM). The memory device 250 may store a variety of information and may be used for various purposes. For example, the memory device 250 may store processor-executable instructions (e.g., firmware or software) for the processor 252 to execute, such as instructions for controlling the harvester 100 and/or the header 112B. The storage device(s) (e.g., nonvolatile storage) may include ROM, flash memory, a hard drive, or any other suitable optical, magnetic, or solid-state storage medium, or a combination thereof. The storage device(s) may store data (e.g., conditions for moving the second header 112B), instructions (e.g., software or firmware for controlling the second header 112B), and any other suitable data. The processor 252 and/or memory device 250, or an additional processor and/or memory device, may be located in any suitable portion of the harvester 100. By way of example, the harvester controller 214 may be located at the chassis 110, and the header controller 224 may be located at the second header 112B.

In the illustrated embodiment, the harvester 100 includes a first set of actuators 254 extending from the chassis 110 to the center segment 218. The harvester controller 214 may be communicatively coupled with the first set of actuators 254 and may be configured to output control signals to the first set of actuators 254 to adjust the center segment 218 relative to the chassis 110. As an example, the harvester controller 214 may output a control signal to instruct a first actuator 254A (e.g., a first subset of actuators of the first set of actuators 254) to raise or lower the center segment 218 relative to the chassis 110, thereby raising or lowering the second header 112B. As another example, the harvester controller 214 may output another control signal to instruct a second actuator 254B (e.g., a second subset of actuators of the first set of actuators 254) to tilt the center segment 218 relative to the chassis 110 (i.e., for tilting the second header 112B to lower a first lateral end of the center segment 218 along the vertical axis 142 and to raise a second lateral end of the center segment 218 along the vertical axis 142). Furthermore, the harvester 100 includes a second set of actuators 256 extending from the center segment 218 to the first and second header segments 220, 222, respectively. The header controller 224 may be communicatively coupled with the second set of actuators 256 and may be configured to output control signals to the second set of actuators 256 to adjust the header segments 220, 222 relative to the center segment 218. By way of example, the header controller 224 may output control signals to a first actuator 256A of the second set of actuators 256 to adjust (e.g., rotate to move toward or away from the ground along the vertical axis 146) the first header segment 220 relative to the center segment 218, and the header controller 224 may output sensor signals to a second actuator 256B of the second set of actuators 256 to adjust (e.g., rotate to move toward or away from the ground along the vertical axis 146) the second header segment 222 relative to the center segment 218. Although the first set of actuators 254 and the second set of actuators 256 each include two actuators in the illustrated embodiment, the first set of actuators 254 and the second set of actuators 256 may include any number of actuators in alternative embodiments.

Additionally, the harvester controller 214 and the header controller 224 may be communicatively coupled to one another to enable the header controller 224 to transmit data to the harvester controller 214. In this manner, the header controller 224 may be configured to actuate the second set of actuators 256 and to transmit data to the harvester controller 214 to enable actuation of the first set of actuators 254. In additional or alternative embodiments, the header controller and the harvester controller may be communicatively coupled to one another to enable the harvester controller to transmit data to the header controller. That is, the harvester controller may actuate the first set of actuators based on sensor information and may provide data (e.g., based on operator input, such as operator input via an interface) that is readable by the header controller for operating the second set of actuators.

Figure 4:
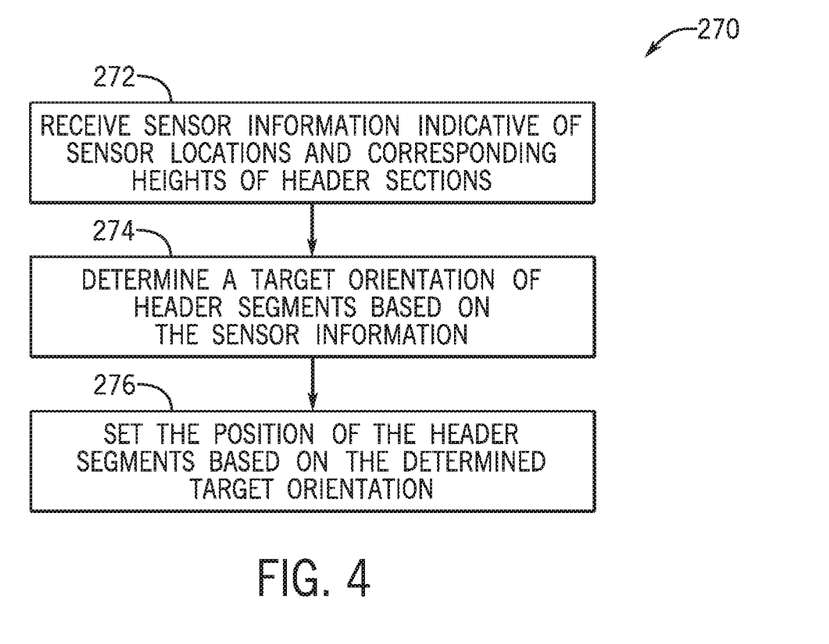
FIG. 4 is a block diagram of an embodiment of a method for positions of header segments, in accordance with an aspect of the present disclosure.
Figure 5:
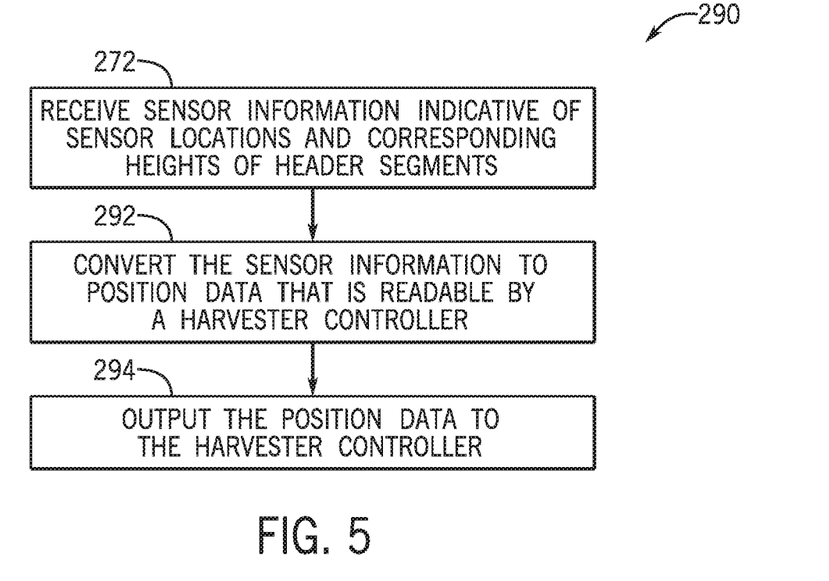
FIG. 5 is a block diagram of an embodiment of a method for converting received sensor information into position data that may be used by a harvester controller, in accordance with an aspect of the present disclosure.
Figure 6:
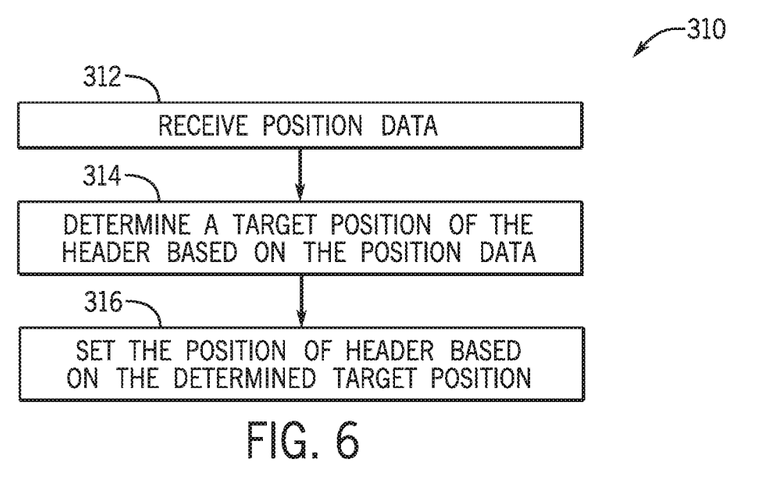
FIG. 6 is a block diagram of an embodiment of a method for setting a position of a header based on position data, in accordance with an aspect of the present disclosure.

FIGS. 4-6 each represent a method or process for operating the harvester, such as for controlling the positioning of the second header. Each of the illustrated methods may be performed by a controller, such as by the harvester controller 214 and/or the header controller 224 of FIGS. 2 and 3. By way of example, each of the methods may be automatically performed during operation of the harvester (i.e., without manual input from an operator of the harvester). Additionally, each method may be performed differently than illustrated in FIGS. 4-6. For instance, additional steps may be performed with respect to each method, and/or certain steps of the methods may be removed, modified, and/or performed in a different order.

FIG. 4 is a block diagram of an embodiment of a method 270 for setting the position of header segments relative to one another. As an example, the header controller may be configured to perform each step of the method 270. At block 272, sensor information is received (e.g., from the second set of sensors). The sensor information may be indicative of a respective location of each sensor at a header section along the header and may include a value detected by the sensor and indicative of a corresponding height (e.g., relative to the field). In this manner, the sensor information may indicate current heights of the header at various header sections.

At block 274, a determination of a target orientation of the header is made based on the sensor information received at block 272. As described herein, the target orientation may include target positions of each header segment relative to the center segment and/or to one another. The target positions may correspond to desirable heights of the header sections based on the current heights included in the sensor information. For example, if it is determined that the center segment is at a desirable height, but the height of the first header segment is low (e.g., is too close to the field), the target orientation may include increasing the height of the first header segment relative to the center segment (e.g., via rotation with the actuator). Similarly, based on the received sensor information, the target orientation may include reducing the height of any of the header segments and/or maintaining the position of any of the header segments relative to one another.

At block 276, based on the determined target orientation, the position of the header segments may be set. For instance, the position of the header segments may be moved and/or maintained to achieve the target orientation of the header segments. Thus, if it is determined that a height of one of the header segments is to be increased, the header segment may be raised. Additionally, if the height of one of the header segments is to be reduced, the header segment may be lowered, and if the height of one of the header segments is at the target orientation, the position of the header segment may be maintained. Thus, the set positions of the header segments may match the target orientation and may enable the header to operate more effectively.

FIG. 5 is a block diagram of an embodiment of a method 290 for converting received sensor information into data that may be used by the harvester controller. As an example, the header controller may be configured to perform each step of the method 290. The method 290 initiates upon receiving sensor information as described with reference to block 272, in which the sensor information may be indicative of sensor locations at various header segments and heights of the header segments. At block 292, after receiving the sensor information, the sensor information is processed and converted into position data that is readable by the harvester controller. As an example, the position data may include a number of readings or values that is indicative of corresponding heights and that the harvester controller is able to receive and to use to control the header (e.g., raise, lower, and/or tilt via the first set of actuators).

In some embodiments, the received sensor information may include a first set of readings corresponding to a first set of header sections. However, the harvester controller may be configured to receive a second set of readings corresponding to a second set of header sections that is different than the first set of header sections. Thus, the first set of readings corresponding to the first set of header sections may be converted to indicate (e.g., represent) the second set of readings corresponding to the second set of header sections. For instance, the first set of readings may be graphically plotted against the first set of header sections. Moreover, a regression analysis (e.g., linear and/or non-linear) may be performed to connect the first set of readings with one another to indicate a relationship between a corresponding reading of each header section along a particular portion or length of the header. The relationship may then be used to determine (e.g., calculate, interpolate) the second set of readings corresponding to the second set of header sections, and the second set of readings may be used by the harvester controller to adjust the header or may otherwise cause the harvester controller to adjust the header in an appropriate manner.

Additionally or alternatively, the received sensor information may include a first operating parameter (e.g., detected by a first type of sensor described above) indicative of the height of the header sections. However, the harvester controller may be configured to receive a second operating parameter (e.g., detected by a second type of sensor different than the first type of sensor) indicative of the height of the header sections. The first operating parameter may be different than the second operating parameter, and the harvester controller may not be able to control the header based on the first operating parameter. For this reason, a determination may be made to convert the first operating parameter to the second operating parameter. For example, the first operating parameter may include first values indicative of particular heights. A determination may then be made as to corresponding second values that are associated with the second operating parameter and are also indicative of substantially the same particular heights. In this way, the first operating parameter and the second operating parameter may each indicate substantially the same height readings of the header. Thus, converting the sensor information to the position data may change the detected operating parameters without substantially changing the heights of the header sections indicated by the sensor information. To this end, for instance, a relationship between the first operating parameter and the second operating parameter may be determined and used for associating a first value of the first operating parameter with a corresponding second value of the second operating parameter. In any case, after the sensor information has been converted into the position data, the position data is output to the harvester controller, as indicated at block 294.

FIG. 6 is a block diagram of an embodiment of a method 310 for setting the position of the header based on position data. As an example, the harvester controller may be configured to perform each step of the method 310. At block 312, position data is received. In certain embodiments, the position data may be position data that was received from the header controller and/or was converted from the sensor information received via the step described at block 272 of FIG. 5. In additional or alternative embodiments, the position data may be directly received from sensors (e.g., the first set of sensors).

At block 314, a determination of a target position of the header (e.g., relative to the chassis) is made based on the position data. The target position of the header may be associated with a position of the center segment of the header relative to the chassis. As an example, the position data may indicate that it is desirable to adjust a height of the center segment relative to the field to enable the header sections of the center segment to operate more effectively. As another example, the position data may indicate that it is desirable to adjust a header segment of the header to a target height of the header segment, but the target height of the header segment may not be achievable by merely moving the header segment relative to the center segment and/or relative to other header segments. Thus, the center segment may be moved relative to the work vehicle to the determined target position to enable the header segment to move to the target height of the header segment.

At block 316, the position of the header (e.g., relative to the chassis) is set based on the determined target position, such as to achieve the target position of the header. By way of example, the center segment may be moved (e.g., raised, lowered, tilted, maintained) relative to the chassis. Thus, in the set position, the position of the header may substantially match the target position and may enable the header to operate more effectively to harvest the field.

In some embodiments, the header controller may use the sensor information to determine a desirable position of the header relative to the chassis. However, since the header controller cannot control movement of the header relative to the chassis, the header controller may determine corresponding position data that causes the harvester controller to move the header to a desirable position. In other words, the header controller may determine the desirable position based on sensor information, and the header controller may convert the sensor information to position data that causes the harvester controller to determine a target position that is equivalent to the determined desirable position. Thus, the harvester controller may set the position of the header to the desirable position originally determined by the header controller. In this manner, the header controller may determine the target orientation of the header segments to set the position of the header segments relative to one another, the header controller may determine the target position of the header for the harvester controller to set the position of the header relative to the chassis, and the header controller may convert sensor information to position data based on the target position of the header.

Further, in certain embodiments, the position of the header relative to the chassis may be set in parallel with setting the position of the header segments relative to one another. To this end, the sensor information may be used for determining the target orientation of the header segments and may concurrently be used for conversion to the position data that is readable by the harvester controller. Thus, the header may be adjusted relative to the chassis while the header segments are adjusted relative to one another. In additional or alternative embodiments, the position of the header relative to the chassis may be set in series with setting the position of the header segments relative to one another. In an example, the position of the header may be initially set relative to the chassis, and then the position of the header segments may be set relative to one another after the header has been set to the new position relative to the chassis. To this end, the sensor information may first be converted to position data to be used by the harvester controller for setting the position of the header relative to the chassis, and the sensor information may subsequently be used by the header controller for setting the position of the header segments relative to one another. In another example, the position of the header segments may be initially set relative to one another first and the position of the header may be set relative to the chassis afterwards. For this reason, the sensor information may be used for setting the position of the header segments relative to one another and after the position of the header segments have been set relative to one another, the sensor information may be converted to position data for setting the position of the header relative to the chassis.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A control system for an agricultural system, comprising:
   a first controller configured to receive sensor information from a plurality of sensors, wherein the sensor information is indicative of a height of a header of the agricultural system, and the first controller is configured to convert the sensor information into position data; and
   a second controller communicatively coupled to the first controller, wherein the second controller is configured to receive the position data from the first controller, and the second controller is configured to determine a target position of the header based on the position data;
   wherein the first controller is configured to instruct a first actuator of the header to adjust a first header segment of the header relative to a second header segment of the header, and the second controller is configured to instruct a second actuator of the header to adjust the header relative to a chassis of the agricultural system.

2. The control system of claim 1, wherein the sensor information comprises first data associated with a first plurality of header sections of the header, the position data comprises second data associated with a second plurality of header sections of the header, and the first plurality of header sections is different than the second plurality of header sections.

3. The agricultural system of claim 2, wherein the first plurality of header sections comprises a different number of header sections than the second plurality of header sections.

4. The control system of claim 3, wherein the first plurality of header sections comprises eight header sections, and the second plurality of header sections comprises four header sections.

5. The control system of claim 1, wherein the sensor information comprises a first operating parameter, the position data comprises a second operating parameter, and the first operating parameter is different than the second operating parameter.

6. The control system of claim 1, wherein the plurality of sensors comprises a contact sensor, a proximity sensor, or both.

7. The control system of claim 1, wherein the first controller is configured to set a position of the first header segment of the header relative to the second header segment of the header based on the sensor information and to utilize the position to instruct the first actuator of the header to adjust the first header segment of the header relative to the second header segment of the header.

8. The control system of claim 1, wherein the second controller is configured to set a position of the header relative to a chassis of the agricultural system based on the target position of the header and to utilize the position to instruct the second actuator of the header to adjust the header relative to the chassis of the agricultural system.

9. The control system of claim 8, wherein the header is coupled to the chassis of the agricultural system, and the second controller is configured to raise, lower, tilt, maintain, or any combination thereof, a center segment of the header relative to the chassis toward the target position of the header.

10. The control system of claim 1, wherein the second controller is configured to:
while the header is coupled to a chassis of the agricultural system over a first time period, receive the position data from the first controller and determine the target position of the header based on the position data received from the first controller; and
while an additional header is coupled to the chassis of the agricultural system over a second time period, receive additional sensor information from an additional plurality of sensors and determine an additional target position of the additional header based on the additional sensor information received from the additional plurality of sensors.

11. The control system of claim 1, wherein the first controller is configured to instruct the first actuator to adjust the first header segment relative to the second header segment based on the sensor information, and the second controller is configured to instruct the second actuator to adjust the header relative to the chassis based on the position data.

12. The control system of claim 1, wherein the first controller is configured to:
determine the target position of the header based on the sensor information; and
convert the sensor information into the position data based on the sensor information to cause the second controller to determine the target position of the header based on the position data.

13. The control system of claim 1, wherein the first controller is configured to:
determine a plurality of values indicative of respective height values of a plurality of header sections of the header; and
include the plurality of values in the position data.

14. The control system of claim 1, wherein the sensor information comprises a first reading at a first portion of the header and a second reading at a second portion of the header, and the first controller is configured to:
graphically plot the first reading and the second reading against the first portion and the second portion of the header;
perform a regression analysis to determine a relationship between the first reading at the first portion and the second reading at the second portion;
determine, based on the relationship, a third reading representative of a third position of the header; and
include the third reading in the position data.

15. A control system for an agricultural system, comprising:
a first controller configured to:
receive sensor information from a plurality of sensors, wherein the sensor information is indicative of a height of a header of the agricultural system, and the header is coupled to a chassis of the agricultural system;
convert the sensor information into position data; and
set a position of a first header segment of the header relative to a second header segment of the header based on the sensor information; and
a second controller communicatively coupled to the first controller, wherein the second controller is configured to:
receive the position data from the first controller;
determine a target position of the header based on the position data;
set a position of the header relative to the chassis of the agricultural system based on the target position of the header; and
raise, lower, tilt, maintain, or any combination thereof, a center segment of the header relative to the chassis toward the target position of the header.

16. The control system of claim 1, wherein the header is coupled to a chassis of the agricultural system, and the second controller is configured to raise, lower, tilt, maintain, or any combination thereof, a center segment of the header relative to the chassis toward the target position of the header.

* * * * *